United States Patent
Bischof

(10) Patent No.: US 6,959,992 B2
(45) Date of Patent: Nov. 1, 2005

(54) ADAPTIVE MIRROR COMPRISING COOLING CHANNELS

(75) Inventor: Dietmar Bischof, Bermatingen (DE)

(73) Assignee: LT Ultra-Precision-Technology GmbH, Aftholderberg (DE)

( * ) Notice: Subject to any disclaimer, the term of this patent is extended or adjusted under 35 U.S.C. 154(b) by 0 days.

(21) Appl. No.: 10/399,616

(22) PCT Filed: Oct. 8, 2001

(86) PCT No.: PCT/EP01/11598

§ 371 (c)(1),
(2), (4) Date: Sep. 11, 2003

(87) PCT Pub. No.: WO02/33471

PCT Pub. Date: Apr. 25, 2002

(65) Prior Publication Data

US 2004/0027698 A1 Feb. 12, 2004

(51) Int. Cl.[7] .............................. G02B 5/08; G02B 7/195
(52) U.S. Cl. ......................... 359/845; 359/846; 359/848
(58) Field of Search ................................. 359/845, 846, 359/847, 848, 849

(56) References Cited

U.S. PATENT DOCUMENTS

| | | | | |
|---|---|---|---|---|
| 1,437,850 A | * | 12/1922 | LaHodny | 359/838 |
| 3,817,606 A | * | 6/1974 | Locke et al. | 219/121.14 |
| 3,832,039 A | * | 8/1974 | Doolittle | 359/846 |
| 4,264,146 A | * | 4/1981 | Sutton | 359/845 |
| 4,492,431 A | * | 1/1985 | Eitel et al. | 359/849 |
| 4,934,803 A | * | 6/1990 | Ealey | 359/845 |
| 5,020,895 A | * | 6/1991 | Giesen et al. | 359/845 |
| 5,589,984 A | * | 12/1996 | Schmidt et al. | 359/603 |
| 5,754,219 A | * | 5/1998 | Ruckl | 347/256 |
| 5,900,996 A | * | 5/1999 | Zadro | 359/846 |

FOREIGN PATENT DOCUMENTS

| | | | | |
|---|---|---|---|---|
| DE | 19832343 A1 | * | 2/2000 | |
| JP | 401042603 A | * | 2/1989 | |

* cited by examiner

Primary Examiner—Ricky D. Shafer
(74) Attorney, Agent, or Firm—Bachman & LaPointe, P.C.

(57) ABSTRACT

A mirror, in particular an adaptive mirror configured as a laser beam guidance component. The mirror comprises a housing, to which a mirror element that is optionally deformable is allocated. The aim of the invention is to construct the mirror element with an oval, in particular elliptical shape.

17 Claims, 3 Drawing Sheets

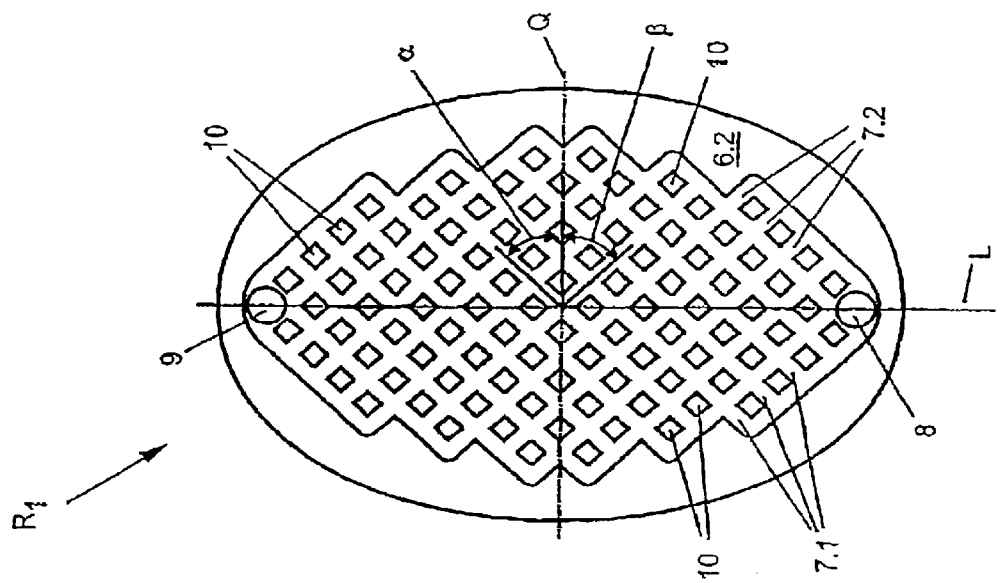
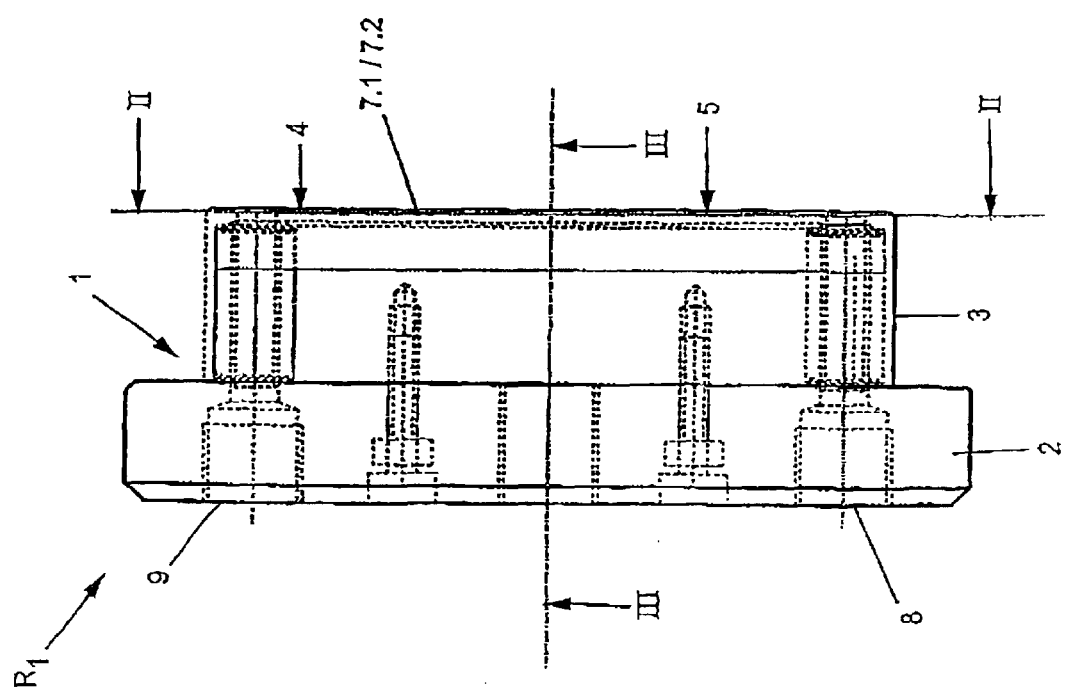
Fig. 2
Fig. 1

ADAPTIVE MIRROR COMPRISING COOLING CHANNELS

BACKGROUND OF THE INVENTION

The invention relates to a mirror, in particular an adaptive mirror as a laser beam guidance component, having a housing which is assigned a mirror element, the mirror element possibly being designed to be deformable.

Game of this type are known and can be obtained in an extremely wide range of forms and designs on the market. They are used substantially as laser beam guidance components for deflecting laser light. In this case, round mirrors are known on the market and likewise can be designed to be deformable in order to perform adjustment of the laser beam.

The disadvantage here is that exact adjustment of different wavefronts and divergences between incident and reflective laser light is carried out only inadequately by a curving of round mirrors.

If a round mirror is deformed, then its mirror surface is curved outward or inward in sections.

Differences in the wavefront cannot be adjusted exactly, nor divergences compensated for, in this way. This leads in particular to changes in the focal point and to undesired changes in the laser beam, in particular its wavefront.

The present invention is based on the object of providing a mirror, in particular an adaptive mirror of the type mentioned at the beginning, which eliminates the aforementioned disadvantages and with which, in a simple and effective manner, divergences between incident and emergent laser light on a mirror surface, in particular on a mirror element, can be adjusted, the intention also being to exert an influence on the appropriate wavefronts.

SUMMARY OF THE INVENTION the foregoing object is achieved by a mirror element which is oval, preferably elliptical.

In the present invention, it is important that the mirror, in particular its diaphragm, is oval. In this case, the mirror element has an overall length and width which differ. The overall length and the width of the mirror element are in a relationship with the angle of the incident and/or emergent laser light, based on a mid-axis which is perpendicular to the surface and/or based on a transverse axis of the mirror element.

In particular as a result of the oval shape of the mirror element, given appropriate deformation, this is curved, in particular around the region of the transverse axis and longitudinal axis, as a controllable adaptive optical unit.

As opposed to round mirrors, curvature is not carried out in the manner of a spherical section or a half-shell section but approximately homogeneously in the region of the mid-axis, differently about the transverse axis and longitudinal axis. The result of different lengths of transverse axis and longitudinal axis, is different radii.

It is just this effect which permits divergences in laser light incident at an angle on the surface of the mirror element to be adjusted.

Since the angle of incidence or emergence of such a mirror, in particular such a laser beam guidance component, is a fixed variable, on the basis of this variable the mirror may be set in accordance with its overall length and width in the ratio overall length is equal to the width divided by cosine squared angle of incidence and/or emergence.

In this way, quite specific angles of incidence and/or emergence, for example 45°, 30°, 15° to a perpendicular mid-axis of the mirror surface, the width and overall length of the mirror element can be determined and defined. Depending on these angles, the oval elliptical shape of the mirror element is then produced or adapted. In this way, a mirror element is provided with which divergences and wavefronts can be influenced in a simple way, if the mirror element is designed as an adaptive optical unit, in particular as a deformable mirror. To this end, the mirror element can be formed from a single diaphragm or a plurality of individual diaphragms, which if appropriate can be cooled directly via cooling ducts. However, the cooling can also be carried out otherwise here. In the preferred exemplary embodiment, however, cooling ducts are provided in the region of the mirror surface, in particular in the region of the diaphragm, in order to cool the surface directly and permanently, independently and decoupled from an actuator for deforming the mirror element permanently.

The foregoing provides a mirror element which may be set adaptively by means of different actuators, it being possible for divergences and wavefronts to be changed or adjusted in particular as a result of its oval shape.

BRIEF DESCRIPTION OF THE DRAWINGS

Further advantages, features and details of the invention emerge from the following description of preferred exemplary embodiments and by using the drawing wherein:

FIG. 1: shows a side view of a deformable mirror, in particular of an adaptive mirror;

FIG. 2: shows a longitudinal section through the deformable mirror in the region of a diaphragm, in particular in the region of cooling ducts along the line II—II according to FIG. 1;

DETAILED DESCRIPTION

Figure 3:
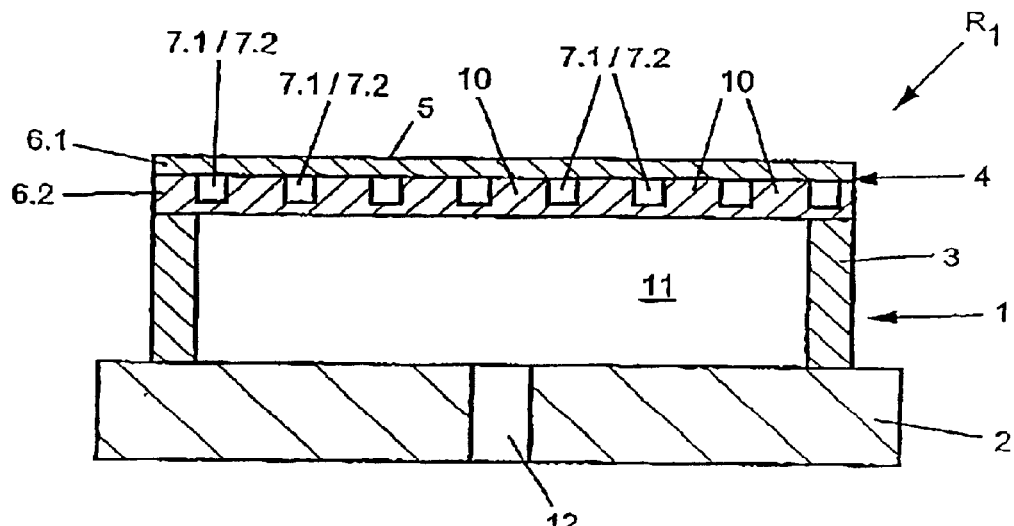
FIG. 3: shows a schematically illustrated cross section through the deformable mirror according to FIG. 1 along the line III—III.

According to FIG. 1, a deformable mirror $R_1$ has a housing 1 which is formed from a baseplate 2, an adjacent cylinder wall 3 and a mirror element 4 closing it on the front side. The mirror element 4 has a polished surface 5 for deflecting incident laser light.

In particular in order to influence the laser light which is incident on the surface 5, the mirror element 4 is deformable, in particular adaptive.

As emerges in particular from the cross-sectional illustration according to FIG. 3, the mirror element 4 comprises at least one diaphragm 6.1, 6.2, the diaphragm 6.1 forming the abovementioned surface 5.

The mirror element 4 is preferably formed in two parts as a diaphragm 6.1, 6.2, a plurality of cooling ducts 7.1, 7.2 being assigned to the mirror element 4, in particular the diaphragm 6.2, in the preferred exemplary embodiment.

As indicated in particular dashed in FIG. 1, the cooling ducts 7.1, 7.2 are fed via a feed 8 and a discharge 9, feed 8 and discharge 9 reaching through the baseplate 2 and opening via the cylinder wall 3 into the mirror element 4, in particular in the cooling ducts 7.1, 7.2 of the latter. Feed 8 and discharge 9 are preferably located on a longitudinal axis L of the diaphragm 6.2 and are preferably arranged at the end.

In the preferred exemplary embodiment according to FIG. 2, the mirror element 4, in particular the diaphragm 6.1, 6.2, is oval, a longitudinal axis L being greater than a transverse axis Q.

A further special feature of the present invention is that the individual cooling ducts 7.1 run parallel to one another and are arranged at a distance from one another and form an angle α of about 30° to 60°, preferably of 45°.

The cooling ducts 7.2 preferably run at right angles and at the same distance likewise parallel to the cooling ducts 7.1 and form an angle β of about −30° to −60°, preferably −45°, to the to the transverse axis Q.

As a result, rectangular web elements 10, which space the respective diaphragms 6.1, 6.2 apart, are produced between the respective cooling ducts 7.1, 7.2.

In order that the mirror element 4, in particular the diaphragms 6.1, 6.2, may be deformed continuously and homogeneously over the complete surface, the diaphragms 6.1 and 6.2 are connected firmly to each another, in particular by a form fit.

As emerges from FIG. 3, an internal space 11, which is used to accommodate actuators or the like (not illustrated here), is formed between the mirror element 4, the cylinder wall 3 and the baseplate 2. In the preferred exemplary embodiment, an opening 12 is formed in the baseplate 2, in which, for example, a compressible or preferably an incompressible medium, such as water or oil, is put and, by means of the application of pressure or vacuum, the mirror element 4 is deformed, the membrane 6.1, 6.2 in particular being curved outward when pressure is applied to the mirror element and curved inward when a vacuum is applied. In this way, for example, the focusing position of a laser which is incident on the surface 5 of the mirror element 4 is influenced.

Figure 4:
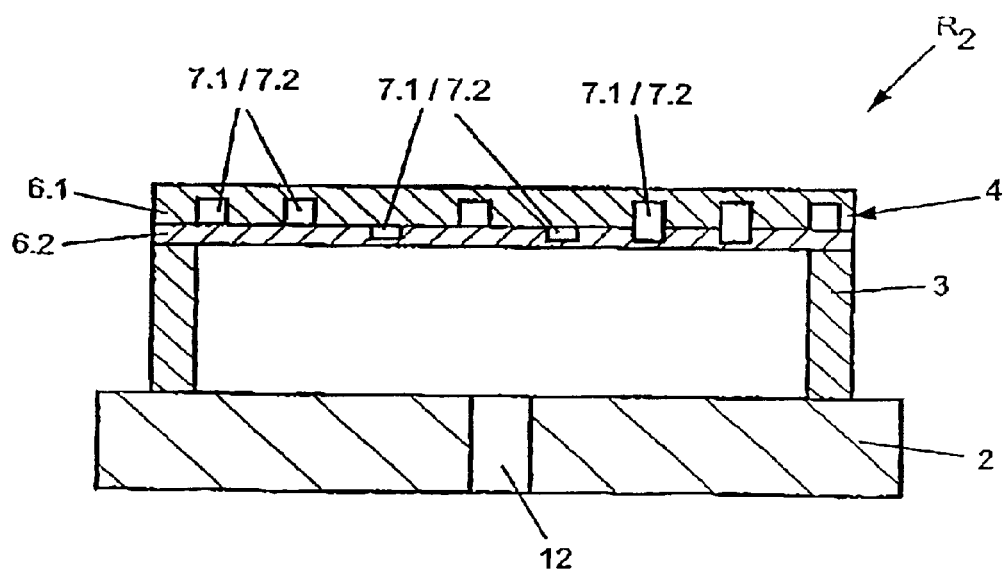
FIG. 4: shows a cross section of the mirror according to FIG. 1 as a further exemplary embodiment.

In a further exemplary embodiment according to FIG. 4, it is shown that the individual cooling ducts 7.1, 7.2 can be provided either in the diaphragm 6.1 and/or in the diaphragm 6.2. These can also be provided so as to overlap in the two diaphragms 6.1, 6.2, it being possible for the latter to be designed with a cross section that is rectangular, curved, semicircular and, in the event of an overlap, round. No limit is to be placed on the invention here.

Furthermore, the scope of the present invention is also to include inserting, for example, mechanically, pneumatically, hydraulically or piezoelectrically operated actuators or the like in the internal space 11, in order to deform the diaphragm 6.1, 6.2 and the mirror element 4.

However, it is important that a mirror surface 5, in particular the diaphragm 6.1, is directly very well cooled, in order in particular to cool the service life by means of this direct cooling of the surface, irrespective of any desired actuators for deforming the mirror element.

In this case, the scope of the present invention is also to include being able to arrange the cooling ducts in the longitudinal direction and/or in the transverse direction or at any desired angles α and β in the diaphragms 7.1, 7.2. The present invention is not to be restricted to this.

Figure 5:
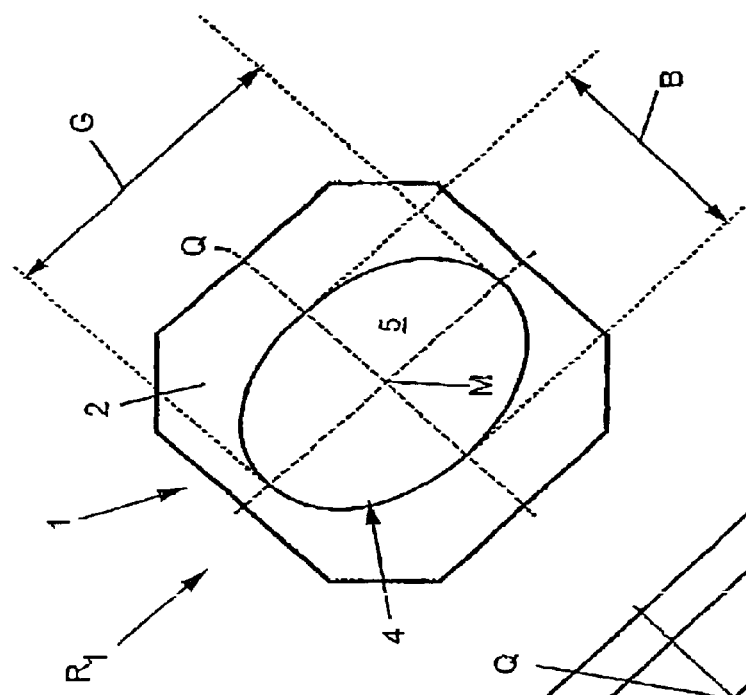
FIG. 5: shows a schematically illustrated plan view of a mirror according to the invention, in particular a deformable mirror.

According to FIG. 5, the mirror $R_1$ is shown as a plan view, in which the mirror element 4 is oval according to the invention. In this case, the mirror element 4 has an overall length G which is substantially greater than a width B.

It is also important in the present invention, in particular if if the mirror $R_1$ is constructed as an adaptive mirror, that its surface 5 be deformable in the manner described above. By means of the deformation of the oval surface, different wavefronts which may be deflected or reflected in the form of laser light at an angle of incidence and/or emergence γ, based on a normal to the surface, for example to a mid-axis M of the mirror element 4 on its surface 5, may be influenced.

In particular via the deformation of the oval mirror surface, the laser beam which strikes a surface 5 will be diverged differently, it being possible for its divergence to be influenced at the same time by the curvature. In particular in the region of the centre M, an oval mirror is curved substantially homogeneously and uniformly.

In this case, a proven relationship between an overall length G and the width B of the mirror element 4, as a function of the angle of incidence γ to a mid-axis M or to the normal to the surface, is for the overall length G to be the width B divided by $(\cos^2 \gamma)$ $(G=B/(\cos^2 \gamma))$.

Figure 6:
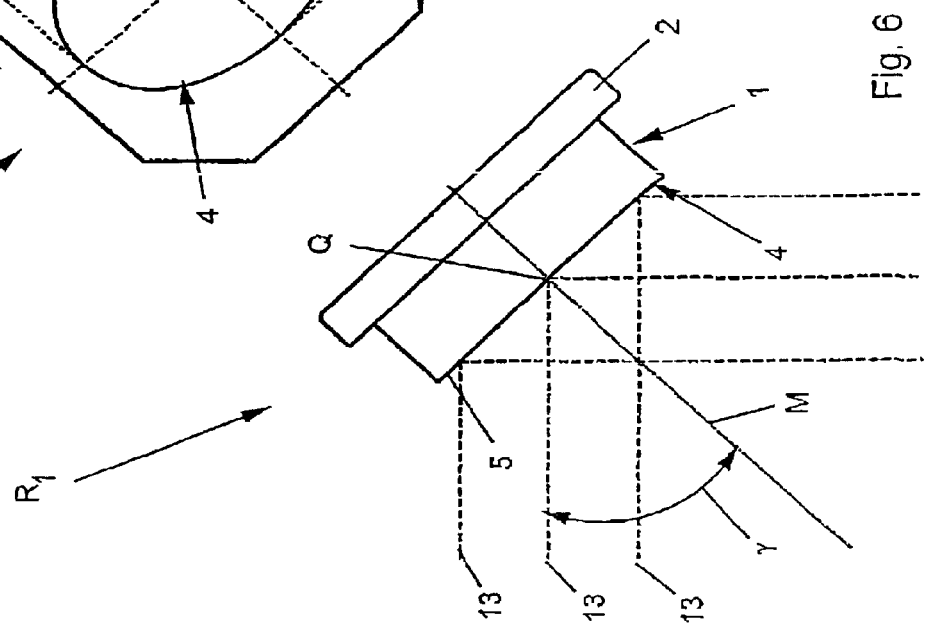
FIG. 6: shows a schematically illustrated side view of the mirror according to FIG. 5 with individual laser beams indicated dashed.

If, for example, the angle of incidence and/or emergence γ to the perpendicular mid-axis M to the surface of the mirror element 4 changes, then the appropriate ratio between the width B and overall length G may be determined via this function $G=B/(\cos^2 \gamma)$. The angle of incidence γ is fixedly predefined for each mirror element, and the overall length G and the width B is in each case determined and designed for this purpose. As illustrated in particular in FIG. 6, individual lightwaves 13 are shown which on one side strike the mid-axis M centrally and, outside the latter, strike a surface 5 and are reflected by this. In this case, the angle of incidence and/or emergence γ, based on a perpendicular mid-axis M to the surface 5, is chosen to be 45° in the preferred exemplary embodiment.

If, for example, this angle γ changes, if this is selected to be larger or smaller, then differences arise in the wavefront of the incident and of the emergent laser light.

In order to select an appropriate curvature and shape of the mirror element optimally in a relationship with the angle γ, the oval shape of the mirror element 4 is used in the manner described above, the width B being related as described above with the overall length G as a function of the angle γ. In this way, for any desired angle γ, an optimum mirror R can be designed which can be adapted to this designed or predefined angle γ. In this way, the quality of the wavefront can also be maintained. Only the divergence of the wavefront may be influenced.

What is claimed is:

1. A mirror for a laser beam guidance component comprising a housing, a deformable mirror element in the housing, the deformable mirror element comprises at least one oval diaphragm formed of two parts, the oval diaphragm is provided with first and second cooling ducts having a first and second arrangement respectively, the first arrangement runs parallel at a distance from one another and the second arrangement runs perpendicular to the first arrangement so as to form a web pattern, wherein the first cooling duct forms an angle (α) of between 30° to 60° to a transverse axis (Q) of the mirror element and the second cooling duct forms an angle (β) of between −30° to −60° to the transverse axis (Q).

2. The mirror as claimed in claim 1, wherein the cooling ducts are connected to at least one feed.

3. The mirror as claimed in claim 2, wherein the feed and a discharge for the cooling ducts are in each case provided at an end and opposite one another in the mirror element.

4. The mirror as claimed in claim 3, wherein the feed and discharge are provided in respective end regions of the mirror element, in the region of a longitudinal axis (L).

5. The mirror as claimed in claim 3, wherein the at least one diaphragm is adjoined by a circumferential cylindrical wall which is connected to a baseplate (2), wherein an internal space is formed between the cylinder wall, the baseplate and the diaphragm.

6. The mirror as claimed in claim 5, wherein the discharge and the feed run through the baseplate and through the cylinder wall and connect to the cooling ducts.

7. The mirror as claimed in claim 5, wherein the internal space has pressure applied to it by one of pneumatically, hydraulically, and piezoelectrically means for the purpose of deformation.

8. The mirror as claimed in claim 1, wherein a width (B) and an overall length (G) of the mirror element is selected as a function of an angle of incidence ($\gamma$) of laser light on a surface of the mirror element.

9. The mirror as claimed in claim 8, wherein the width (B) is less than the overall length (G).

10. The mirror as claimed in claim 9, wherein a ratio between the overall length (G) and the width (B) of the mirror element is set to be ($G=B/\cos^2 \gamma$).

11. The mirror as claimed in claim 10, the angle ($\gamma$) forms an angle of incidence and angle of emergence between a perpendicular mid-axis (M) to the surface of the mirror element.

12. The mirror as claimed in claim 11, wherein at the angle of incidence ($\gamma$), the ratio of overall length (G) and the width (B) is calculated in accordance with ($G=B/(\cos^2 \gamma)$).

13. The mirror as claimed in claim 1, wherein the first and second cooling ducts are provided in one or more parts of the diaphragm of the mirror element.

14. The mirror as claimed in claim 1, wherein the web pattern runs diagonally to a longitudinal axis (L) and to the transverse axis (Q) of the mirror element (4).

15. The mirror as claimed in claim 1, wherein the at least one diaphragm has pressure applied to it by one of mechanically, pneumatically, hydraulically, and piezoelectrically means for the purpose of deformation.

16. The mirror as claimed in claim 1, wherein the cooling ducts are formed with a cross section which is one of rectangular, oval, round and a section of a part circle.

17. The mirror as claimed in claim 1, wherein the mirror element can be deformed independently an cooled separately and independently.

* * * * *